United States Patent [19]

Koshimizu

[11] Patent Number: 4,996,889
[45] Date of Patent: Mar. 5, 1991

[54] ELECTROMAGNETIC FLOWMETER

[75] Inventor: Atsushi Koshimizu, Kanagawa, Japan

[73] Assignee: Yamatake-Honeywell Co., Ltd., Tokyo, Japan

[21] Appl. No.: 352,102

[22] Filed: May 15, 1989

[30] Foreign Application Priority Data

May 19, 1988 [JP] Japan .................. 63-120548

[51] Int. Cl.⁵ .............................................. G01F 1/58
[52] U.S. Cl. ............................................. 73/861.12
[58] Field of Search ................................... 73/861.12

[56] References Cited

U.S. PATENT DOCUMENTS 3,334,518  8/1967  Miyamichi ................. 73/861.12
3,824,856  7/1974  Yard ......................... 73/861.12
4,507,975  4/1985  Bittner et al. ............. 73/861.12

FOREIGN PATENT DOCUMENTS

WO84/03764  9/1984  PCT Int'l Appl. ........... 73/861.12

Primary Examiner—Charles A. Ruehl
Attorney, Agent, or Firm—Blakely, Sokoloff, Taylor & Zafman

[57] ABSTRACT

An electromagnetic flowmeter includes a measuring pipe and a cylindrical case. The measuring pipe has a pair of pipe connecting flanges at both ends of its outer surface. The cylindrical case surrounds the outer surface of the measuring pipe so as to cover a pair of excitation coils arranged on the outer surface of the measuring pipe, and is welded and fixed to ring-like collar portions extending from inner surfaces of the flanges. The thickness of the ring-like collar portions to which the case is welded and fixed is set to be larger than that of the case.

3 Claims, 4 Drawing Sheets

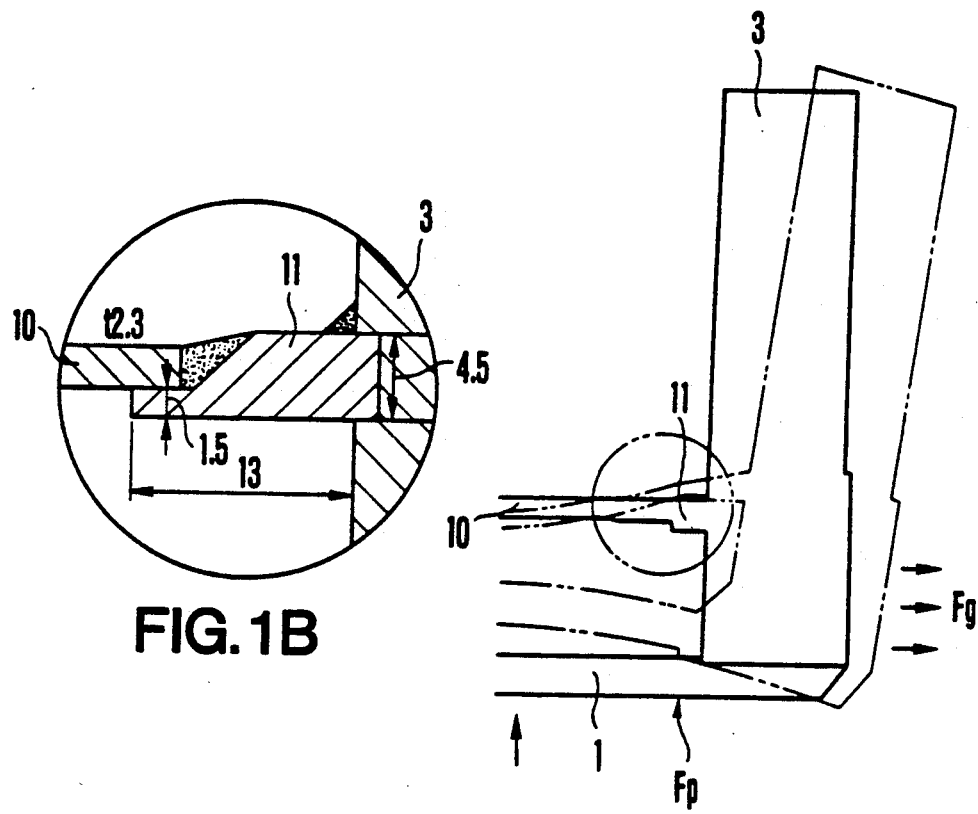
FIG. 1B
FIG. 1A
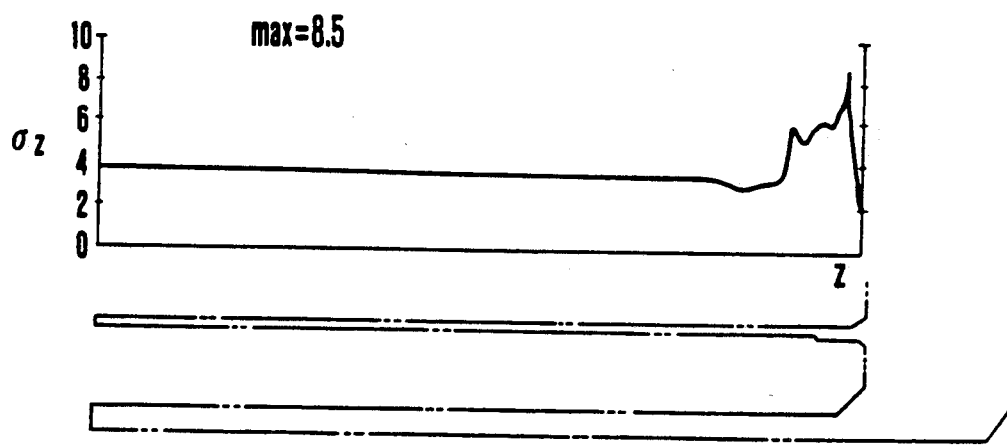
FIG. 2

ELECTROMAGNETIC FLOWMETER

BACKGROUND OF THE INVENTION

The present invention relates to an electromagnetic flowmeter having pipe connecting flanges at both ends of its measuring pipe, for electrically measuring a flow rate of a fluid which flows through a pipe and, more particularly, to an improvement of a case structure welded and fixed to the ring-like collar portions on the inner surface sides of both flanges so as to cover excitation coils around the measuring pipe.

A conventional electromagnetic flowmeter utilizes Faraday's law of electromagnetic induction and converts a flow rate of a conductive fluid passing through a measuring pipe into an electrical signal. Various flowmeters have been known as electromagnetic flowmeters of this type. Generally, a measuring pipe of this type comprises a nonmagnetic metal measuring pipe which has pipe connecting flanges at both ends so as to be inserted in a portion midway along a pipe through which a fluid flows. There is an insulating lining which is made of an insulating material such as Teflon or rubber and is formed to cover the inner surface of the measuring pipe. A pair of excitation coils are wound substantially in the form of a saddle and arranged to vertically sandwich the outer surface of the measuring pipe thereby generating a magnetic field in a direction perpendicular to the direction of the fluid flowing through the measuring pipe. A pair of electrodes are inserted and fixed in electrode mounting portions having electrode insertion holes respectively formed in portions of the wall of the measuring pipe so as to oppose each other. There are liquid contact ends opposing each other in a direction perpendicular to the directions of the fluid and the magnetic field generated by the excitation coils. A cylindrical case is arranged around the measuring pipe so as to cover the excitation coils. As is known, such a measuring pipe is inserted in a portion midway along a pipe through which a fluid flows by respectively fastening and fixing the above-described flanges to pipe side flanges by using bolts, nuts, and the like. When the conductive fluid to be measured flows through a magnetic field generated by the excitation coils, an electromotive force is generated in the fluid. The electromotive force is then extracted from the electrodes to measure the flow rate of the fluid flowing through the measuring pipe.

Especially in the above-described electromagnetic flowmeter, a fully welded structure obtained in a simplifying arrangement has been proposed. According to this structure, a case designed to surround a measuring pipe is welded and fixed to the ring-like collar portions or the like extending from the inner surfaces of the pipe connecting flanges. With this structure the case can be made of an iron plate so that the cost can be reduced and the strength is increased. If pipe connecting flanges are selected in accordance with a pipe, since other components and the like can be standardized, this structure is advantageous in terms of mass production. In addition, this structure is not easily influenced by bolts, nuts, and the like for connecting flanges to a pipe, and a space for storing excitation coils, their mounting bands, and the like to be attached to the outer surface of a measuring pipe can be ensured to a certain degree.

In the electromagnetic flowmeter having the above-described fully welded structure, excessive stress concentration is locally caused in the case and the ring-like collar portions or the like for mounting the case due to an external force during a pipe connecting period for connecting the flanges at both ends of the measuring pipe to fluid pipe flanges, thus posing a problem in terms of strength. Even damage and the like of these components may occur. Stress concentration during this pipe connecting period is conspicuous at portions of the ring-like collar portions extending from the flanges and serving as case bonding portions, and hence large bend occurs at the bonding portions between the collar portions and the case. Therefore, demand has arisen for a countermeasure to reduce this stress concentration.

In order to ensure the strength at the bonding portions between the collar portions and the case, the flange, the ring-like collar portions, and the like of the measuring pipe are conventionally formed to have thicknesses with enough margins. In such a conventional structure, however, stress concentration at the bonding portions between the collar portions and the case cannot be prevented. In order to prevent this, each component must be further increased in thickness and size. Such an increase in thickness poses problems, e.g., an increase in overall weight and cost.

Furthermore, in order to prevent heat influences upon welding/fixing of the ring-like collar portions to the case from being transmitted to an insulating lining, the collar portions are desired to be formed to have a thickness as small as possible. In consideration of strength, the thickness of the case is conventionally increased to reinforce the structure, and hence the above-described problems become conspicuous. Therefore, demand has arisen for a countermeasure to reduce the above stress concentration in consideration of these points.

SUMMARY OF THE INVENTION

It is a principal object of the present invention to provide an electromagnetic flowmeter wherein stress concentration can be prevented.

It is another object of the present invention to provide an electromagnetic flowmeter allowing a reduction in weight and cost.

In order to achieve the above objects of the present invention, according to the present invention, there is provided an electromagnetic flowmeter comprising a measuring pipe having a pair of pipe connecting flanges at both ends of an outer surface thereof, and a cylindrical case which surrounds the outer surface of the measuring pipe so as to cover a pair of excitation coils arranged on the outer surface of the measuring pipe and which is welded and fixed to the ring-like collar portions extending from inner surfaces of the flanges, wherein a thickness of the ring-like collar portions to which the case is welded and fixed is set to be larger than that of the case.

According to the present invention, the measuring pipe, the flanges, the case, and the collar portions of the electromagnetic flowmeter to which mechanical stress is applied are formed as models, and an analysis of a double cylindrical structure consisting of the measuring pipe and the case is performed by strength calculations based on a finite element method. As a result, the ring-like collar portions respectively extending from the flanges have a thickness larger than that of the case. The shape of the collar portions and the thickness of the case are selected to distribute stress concentration focused on the bonding portions between the collar portions and the case so as to ensure necessary and satisfactory strength of the bonding portions. In addition, since the case is made of a thin plate having a high elasticity, and the thickness of the plate is minimized, the overall electromagnetic flowmeter can be reduced in weight and cost.

BRIEF DESCRIPTION OF THE DRAWINGS

FIGS. 1A and 1B show an enlarged view of a collar portion and an enlarged sectional view of a main part including its displaced state of an electromagnetic flowmeter according to an embodiment of the present invention;

FIG. 2 is a graph showing a stress distribution in the axial direction of a pipe during a pipe connecting period;

DETAILED DESCRIPTION OF THE PREFERRED EMBODIMENT

Figure 3:
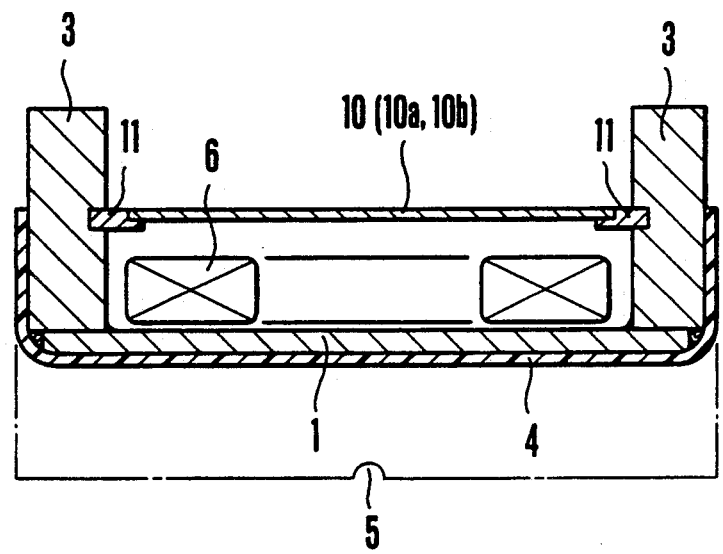
FIGS. 3 and 4 are sectional view of a main part and a schematic side view, respectively, showing a schematic arrangement of the electromagnetic flowmeter.
Figure 4:
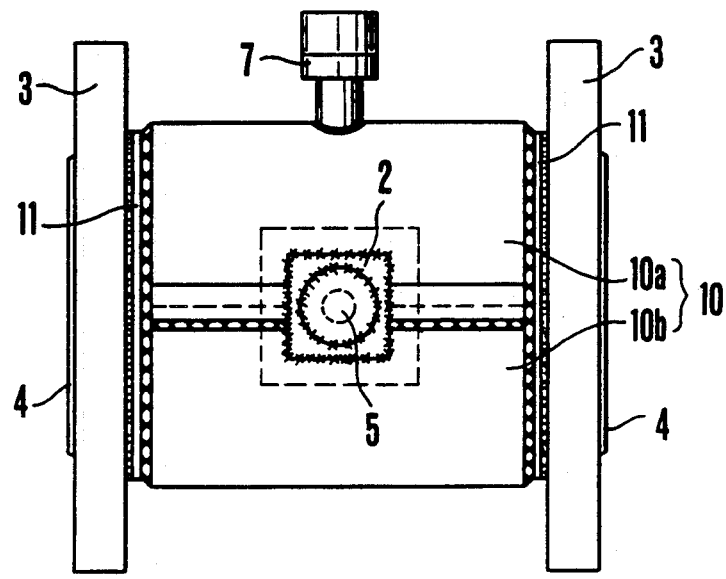

FIGS. 1A to 4 show an electromagnetic flowmeter according to an embodiment of the present invention. A schematic arrangement of the electromagnetic flowmeter will be briefly described below with reference to FIGS. 3 and 4. Reference numeral 1 denotes a measuring pipe made of a nonmagnetic metal material such as stainless steel. A pair of rectangularly cylindrical electrode mounting portions 2 (only one of them is shown) are formed at central portions of the outer surface of the measuring pipe 1 in its longitudinal direction so as to extend outwardly from opposite positions. A pair of pipe connecting flanges 3 are formed at outer surface portions of both ends of the measuring pipe 1 to interpose the measuring pipe 1 in a pipe (not shown) through which a fluid to be measured flows. An insulating lining 4 consisting of Teflon, rubber, or the like is coated on the entire inner surface of the measuring pipe 1 including outer surfaces of the flanges 3. The lining 4 extends to the inner wall surfaces of electrode inserting holes (not shown) through which a pair of electrodes 5 (only one of them is shown) is inserted. The electrodes 5 extend into the measuring pipe at the electrode mounting portions 2 so as to oppose each other and have liquid contact ends opposing each other in a direction perpendicular to the flowing direction of the fluid.

Reference numeral 6 denotes a pair of excitation coils (only one of them is shown), wound substantially in the form of a saddle and arranged to vertically sandwich the outer surface of the measuring pipe 1, for generating a magnetic field in the direction perpendicular to the flowing direction of the fluid. The pair of electrodes 5 are designed to respectively oppose the excitation coils 6 in the direction of the magnetic field generated by the excitation coils 6 and the flowing direction of the fluid, so that an electromotive force generated in the conductive fluid is extracted to measure the flow rate of the fluid flowing through the measuring pipe 1.

Reference numeral 10 denotes a cylindrical case surrounding the outer surface of the measuring pipe 1 and forming a coil chamber by covering the excitation coils 6 (including internal components such as mounting bands). The cylindrical case 10 also serves as a casing member of the electromagnetic flowmeter. In this embodiment, the cylindrical case 10 is designed such that welding edge portions of substantially semicylindrical case members 10a and 10b are overlapped and fixed to each other by welding (see FIG. 4). Note that reference numeral 7 in FIG. 4 denotes a terminal box (or converter) which is arranged on an upper central portion of the case 10 and to which leads and the like extending to the excitation coils 6 are connected. The base of the terminal box 7 is also fixed to the case 10 by welding. Ring-like collar portions 11 respectively extend from the surfaces of the flanges 3 at a predetermined height. In addition, rectangular flange pieces are formed on the outer surfaces of the electrode mounting portions 2, so that the case 10 may be welded and fixed to the collar portions 11 and the flange pieces.

According to the present invention, the above-described electromagnetic flowmeter comprises the measuring pipe 1 having the pair of pipe connecting flanges 3 at both ends, and the cylindrical case 10 arranged to surround the outer surface of the measuring pipe 1 so as to cover the pair of excitation coils 6, which are arranged on the outer surface of the measuring pipe 1 so as to oppose each other, and welded and fixed to the ring-like collar portions 11 extending from the inner surface of the flanges 3. The present invention can be characterized in that the thickness of each ring-like collar portion 11 for fixing the case 10 is set to be larger than that of the case 10 on the basis of strength analysis according to a finite element method (FEM), which has recently received a great deal of attention, as shown in FIGS. 1A and 2.

More specifically, according to the present invention, in the above-described electromagnetic flowmeter, components on which a mechanical stress acts, e.g., the measuring pipe 1, the flanges 3, the case 10, and the ring-like collar portions 11 are formed as models, and analysis based on strength calculations is performed by a finite element method using a double structure of the measuring pipe and the case. On the basis of the calculation result, the shape of the collar portions 11 and the thickness of the case 10 are properly selected to distribute stress concentrated on bonding portions between the collar portions 11 and the case 10, i.e., the thickness of each collar portion 11 extending from a corresponding flange 3 side is set to be larger than that of the case 10 welded to the collar portion 11, thereby providing a necessary and satisfactory strength. In addition, according to the present invention, since the case 10 is made of a thin plate having a high elasticity so as to minimize the thickness of the case 10 on the basis of the above-described arrangement, the overall electromagnetic flowmeter can be reduced in weight and cost.

Figure 5:
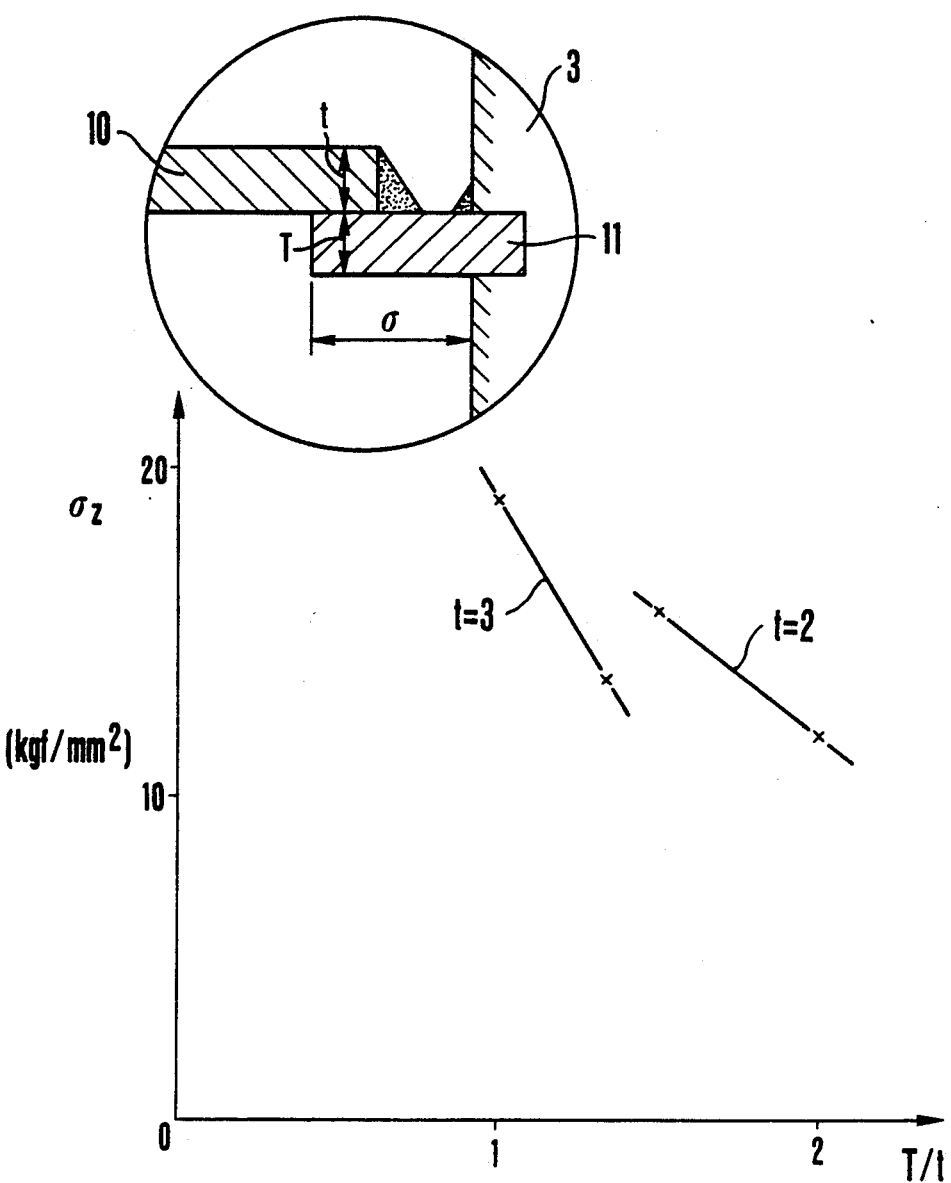
FIG. 5 is a graph showing a relationship between a maximum stress value and a ratio of a collar thickness to a case thickness.
Figure 6B:
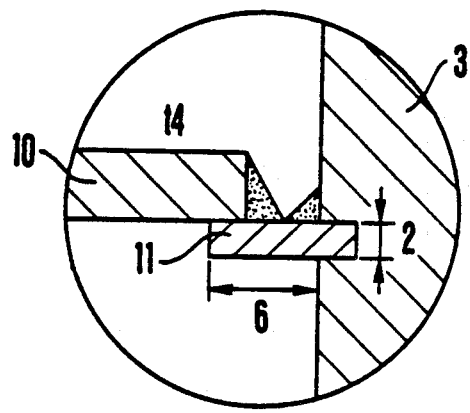
FIGS. 6A, 6B and 7 are enlarged sectional views of a main part and a stress distribution of a conventional electromagnetic flowmeter.
Figure 6A:
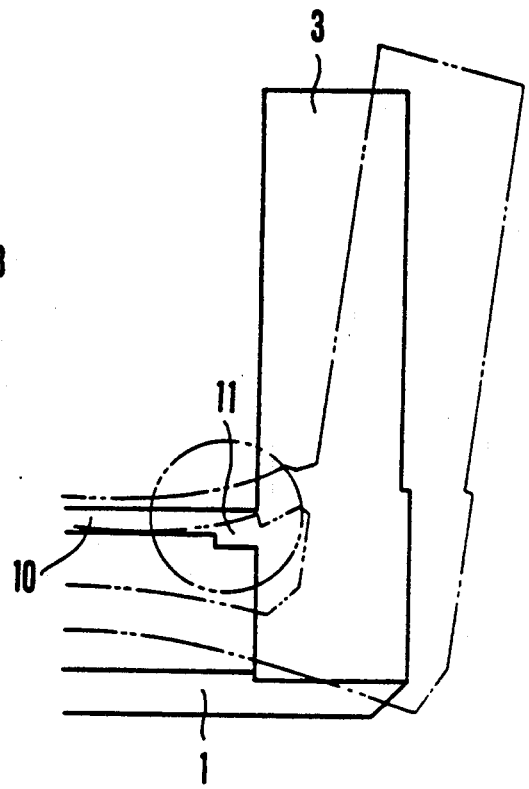

The electromagnetic flowmeter of the present invention will be compared with a conventional electromagnetic flowmeter shown in FIGS. 5, 6A and 6B. According to the conventional structure, a thick case 10 is welded and fixed to each collar portion 11 whose thickness is minimized to prevent conduction of heat influences upon welding of the case 10. When strength analysis of this structure was performed by the above-described finite element method, as is apparent from FIG. 6A, it was confirmed that a stress reaching a value of 12.9 Kgf/mm$^2$ (a maximum stress value $\sigma$ zmax) was locally and excessively concentrated at the collar portion 11 on the flange 3 side, and hence damage might be caused. In this case, as strength analysis calculation models based on the finite element method, a flange 3, the ring-like collar portions 11, and the case 10 were made of an SS41, Rolled Steel for General Structure (JIS G 3101) and a measuring pipe 1 is made of SUS304, Light Gauge Stainless Steel Pipes for Ordinary Piping (JIS G 3448). In this case, diameters of a measuring pipe 1 were set to be Nominal Size 300 mm, and a connecting structure and a design pressure complied with Pressure Rating JIS20K. The strength analysis was performed by calculating external forces acting on the measuring pipe 1 and the flanges 3, a force Fp radially acting inside the measuring pipe 1 due to its internal pressure, and a clamp force Fg of a pipe gasket. However, a detailed description of this analysis will be omitted.

Figure 7:
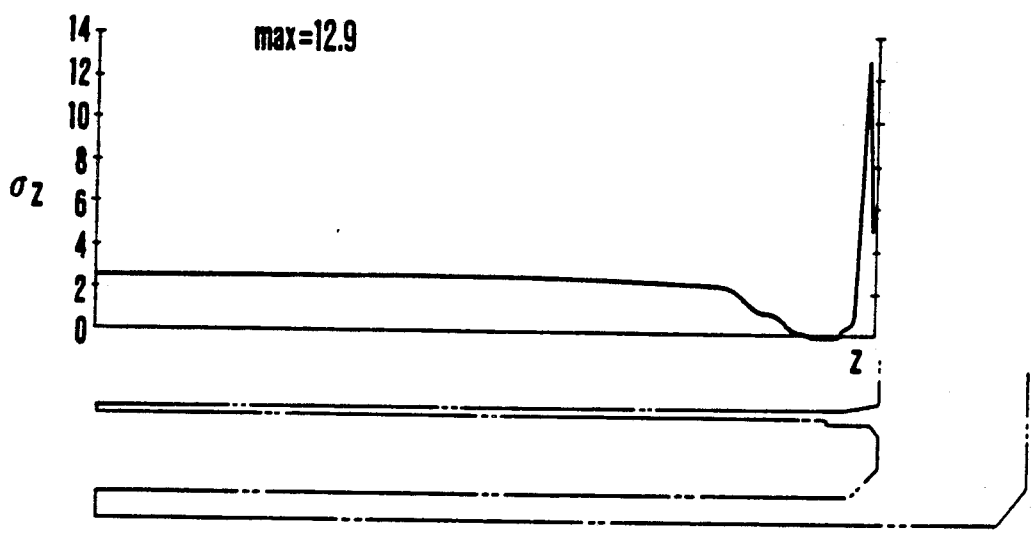

The present inventors performed various examinations based on the strength calculation results according to the above-described finite element method. As a result, it was confirmed that when the thickness and shape of the collar portion 11 were set in comparison with the case 10, and the case 10 was made of a steel plate having a thickness t of 2.3 mm so as to have a certain elasticity, the maximum stress value $\sigma$ zmax was increased to 8.5 Kgf/mm$^2$, i.e., about ⅔ that of the conventional structure, and the stress was distributed over the case 10 and the collar portion 11. In other words, it was confirmed that when "the case thickness>the collar portion thickness", the maximum stress was large, whereas when "the case thickness<the collar portion thickness", the maximum stress was small. This tendency, for example, can be easily understood from a graph in FIG. 7, which shows a relationship between the stress value ($\sigma_2$) and a ratio of the collar portion thickness (T) to the case thickness (t). The data shown in FIG. 7 is obtained from calculation results when only the pipe diameter of the conditions of the conventional structure shown in FIG. 5 and the like is changed to Nominal Size 250 mm. It is also apparent from this data that as the collar portion thickness becomes larger than the case thickness, the above-described excessive stress concentration can be prevented more effectively.

In this embodiment, the thickness of the collar portion 11 is set to be 4.5 mm; the extension length thereof from the flange 3, 13 mm; and the thickness t of the case, 2.3 mm. The structure of a bonding portion by welding in this embodiment is slightly different from that of the conventional case shown in FIG. 5, wherein the collar portion 11 to be welded to the case 10 of 4 mm has a thickness of 2 mm, and the flange 3 has an extension length of 6 mm. This is because the welded bonding portion of the case 10 is separated from the flange 3 to minimize heat conduction through the collar portion 11. In addition, the case 10 is shaped to be easily welded to the collar portions 11.

The present invention is not limited to the structure of the embodiment described above. The shapes and structures of the respective components of the electromagnetic flowmeter can be arbitrarily changed and modified. For example, in the above-described embodiment, the ring-like collar portions 11 are designed to respectively extend from the inner surfaces of the flanges 3 such that ring-like members made of metal pipes or those obtained by curving belt-like plates by rolling are fitted in and welded/fixed to annular grooves formed in the flanges 3. Especially when the belt-like plates are utilized, the respective components can be formed with high size precision such as the thickness, the length, and the like of the collar portion 11, and the cost can be reduced. In addition, this structure is excellent in workability and assembly. However, the present invention is not limited to this. The collar portions 11 can be integrally formed with the flanges 3.

In the above-described embodiment, when the ring-like collar portions 11 are to be formed, the ring-like members are fitted in and welded to the annular grooves of the flanges 3, and their bonding surfaces with the case 10 are then formed into a predetermined shape. However, it is easily understood that the ring-like member having case bonding surfaces which are worked in advance can be welded and fixed to flanges. The shapes and the like of the ring-like collar portions described above are properly set in accordance with a stress value acting on the collar portions 11. In addition, it is easily understood that the thickness of the case 10 is properly selected in accordance with the rigidity of the collar portions 11.

As has been described above, according to the present invention, the electromagnetic flowmeter comprises a measuring pipe having a pair of pipe connecting flanges at both ends, and a cylindrical case which surrounds the outer surface of the measuring pipe so as to cover a pair of excitation coils arranged on the outer surface of the measuring pipe and which is welded and fixed to ring-like collar portions extending from the inner surfaces of the flanges. The thickness of each ring-like collar portion is set to be larger than that of the case on the basis of a strength analysis according to a finite element method. In spite of a simple arrangement, a proper stress distribution can be achieved by selecting a collar portion shape on the flange sides and a case thickness allowing a necessary and sufficient strength against a stress acting during a pipe connecting period, thereby eliminating the conventional problems such as damage due to excessive stress concentration. In addition, the present invention is advantageous in that, e.g., a lightweight, low-cost electromagnetic flowmeter can be realized by reducing the thickness of the case.

What is claimed is:

1. An electromagnetic flowmeter comprising:
   a measuring pipe having first and second ends and inner and outer surfaces;
   a pair of excitation coils for generating a magnetic field perpendicular to the direction of flow of a fluid through said measuring pipe;
   a first pipe connecting flange having inner and outer surfaces, said first pipe connecting flange being connected at said outer surface of said measuring pipe at said first end;
   a second pipe connecting flange having inner and outer surfaces, said second pipe connecting flange being connected at said outer surface of said measuring pipe at said second end;
   a pair of ring-like collar portions extending from said inner surfaces of said first and second flanges at a predetermined height; and
   a cylindrical case which surrounds said outer surface of said measuring pipe, said case being affixed to said ring-like collar portions such that said case is not in direct contact with said flanges, said case having a thickness that is less than the thickness of said ring-like collar portions to which said case is affixed.

2. The electromagnetic flowmeter of claim 1 further comprising an insulating lining affixed on said inner surface of said measuring pipe.

3. The electromagnetic flowmeter of claim 2 wherein said insulating lining is further affixed to said outer surfaces of said pipe connecting flanges.

* * * * *

UNITED STATES PATENT AND TRADEMARK OFFICE
CERTIFICATE OF CORRECTION

PATENT NO. : 4,996,889
DATED : 3/5/91
INVENTOR(S) : Koshimizu

It is certified that error in the above-identified patent and that said Letters Patent is hereby corrected as shown below:

| | | |
|---|---|---|
| col. 01, line 56 | delete "can be" | insert --is-- |
| col. 04, line 34 | after "IA" | insert --, IB-- |
| col. 05, line 22 | delete "t" | insert --$\underline{t}$-- |
| col. 05, line 44 | delete "t" | insert --$\underline{t}$-- |

Signed and Sealed this

Twentieth Day of October, 1992

Attest:

DOUGLAS B. COMER

*Attesting Officer*   *Acting Commissioner of Patents and Trademarks*